United States Patent [19]

Chamberlain

[11] 3,965,393

[45] June 22, 1976

[54] TELEVISION X-RADIATION PROTECTION DEVICE AND CIRCUIT

[75] Inventor: Richard Travers Chamberlain, Arlington Heights, Ill.

[73] Assignee: Admiral Corporation, Schaumburg, Ill.

[22] Filed: Apr. 21, 1971

[21] Appl. No.: 135,840

[52] U.S. Cl. .................................. 317/16; 315/119; 317/31; 317/51; 317/62; 328/9; 325/362

[51] Int. Cl.[2] ........................................... H02H 3/00

[58] Field of Search ................... 317/16, 51, 62, 31; 178/7.3 D; 315/119; 325/362; 328/9

[56] References Cited

UNITED STATES PATENTS

| | | | |
|---|---|---|---|
| 3,267,321 | 8/1966 | Gessford | 317/62 X |
| 3,546,536 | 12/1970 | Umin | 317/51 |

*Primary Examiner*—J. D. Miller
*Assistant Examiner*—Harry E. Moose, Jr.

[57] ABSTRACT

A color television receiver circuit for preventing excessive X-radiation is described. A spark gap is coupled between the high voltage supply for the color tube and ground. Should the high voltage output tend to exceed a level beyond which undesirable X-radiation may be emitted, the spark gap breaks down, effectively shorting the high voltage output to ground and preventing the excessive voltage condition. At the same time, the picture is eliminated and the viewer must have the set serviced. Two embodiments are described in detail. In one, the spark gap is built into the tube socket of a high voltage rectifier; in the other, the spark gap is incorporated into a voltage multiplier circuit.

2 Claims, 5 Drawing Figures

INVENTOR
Richard T. Chamberlain
by Pendleton, Neuman, Williams and Anderson Att'ys INVENTOR
Richard T. Chamberlain
by Pendleton, Neuman, Williams and Anderson Attys

TELEVISION X-RADIATION PROTECTION DEVICE AND CIRCUIT

BACKGROUND OF THE INVENTION

The invention is directed generally to the field of television receivers and, more particularly, to a device for limiting the amount of X-radiation generated by a color television receiver.

The cathode ray tube for a color television receiver requires a high anode voltage to provide the accelerating potential so that electrons emitted from the cathode will have sufficient energy upon striking the luminescent phosphors of a color television tube screen to produce a bright color television picture. The anode voltages may range from 15 kilovolts (KV) in a small set to 27.5 KV in a large set.

The amount of X-radiation generated by a color television receiver operated at these voltages is well within acceptable limits. However, if, through some malfunction, the operating voltages should exceed these levels, then the X-radiation may increase to an undesirable level.

SUMMARY OF THE INVENTION

It is an object of this invention to provide means for assuring that the television receiver will not be operated to generate an unacceptable level of X-radiation. It is another object to incorporate an X-radiation protective device, constructed according to the principles of this invention, in the television receiver in such a manner that it cannot be removed either purposely or by an oversight. Further objects and advantages will be apparent from the description of the invention in the specification, drawings and claims.

The invention employs a spark gap, or other suitable device having a calibrated breakdown voltage, in shunt across the high voltage supply. The spark gap is calibrated to break down at the appropriate limit for the ultor anode voltage of the color cathode ray tube. In the event the anode voltage should tend to exceed the limit, the spark gap will break down, with the result that the voltage rise will be prevented and excessive X-radiation will be curtailed. At the same time, the picture will be eliminated and the viewer will necessarily turn the set off and have it serviced.

In the preferred embodiment, the spark gap is constructed with permanently fixed tolerances, thereby preventing any alteration by the owner or serviceman. The device is integrally and permanently installed in the receiver itself or preferably in a part of the receiver which, if in need of replacement, must be ordered from the original manufacturer. Either construction guarantees that the tolerances and performance of the device shall be determined and controlled by the set manufacturer.

THE DRAWINGS

DESCRIPTION OF THE PREFERRED EMBODIMENTS

Figure 1:
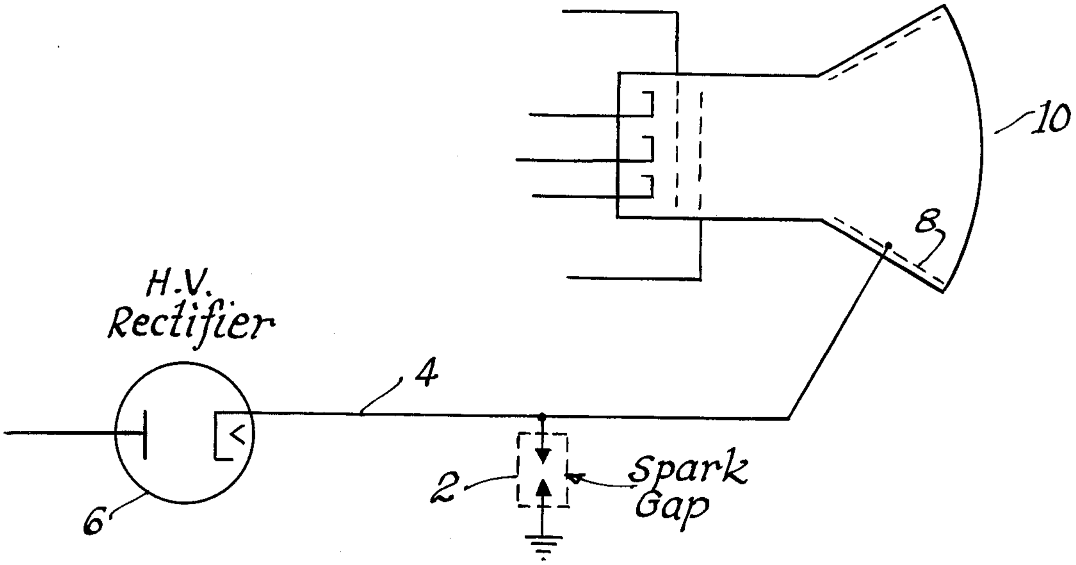
FIG. 1 is a schematic diagram showing the overvoltage protective device of the invention as it is incorporated into the receiver.

The circuit configuration of the protection device is shown in FIG. 1. A voltage breakdown device 2 constructed according to the present invention is shunted across the high voltage supply line 4, leading from the high voltage rectifier 6, to the ultor anode 8 of the cathode ray tube 10. With the exception of the spark gap 2, the circuit is a conventional high voltage supply. The spark gap 2 of this preferred embodiment is calibrated to break down at a voltage of approximately 27.5 KV; the exact voltage will depend to some extent on the particular circuit and picture tube being used. In the event the high voltage reaches the breakdown point, the voltage on the high voltage line 4 will be substantially reduced — effectively shunted to ground — thereby preventing any excessive X-radiation. Additionally, the picture is immediately cut off the screen causing the viewer to turn off the television receiver. The overvoltage condition can then be remedied by a serviceman to whom the situation would be immediately evident.

Figure 2:
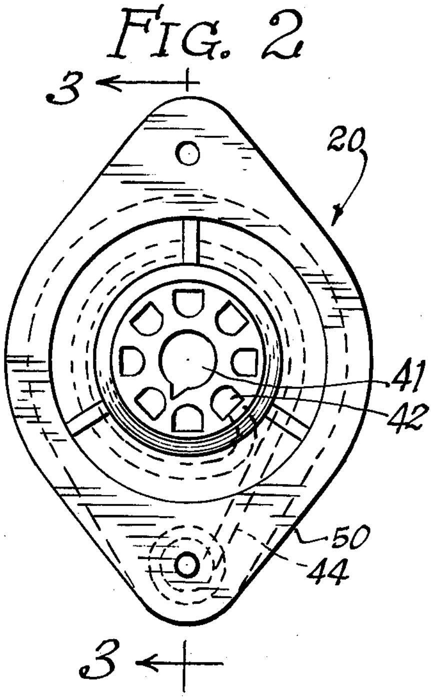
FIG. 2 is a top plan view of a high voltage rectifier socket incorporating a spark gap designed in accordance with the present invention.
Figure 3:
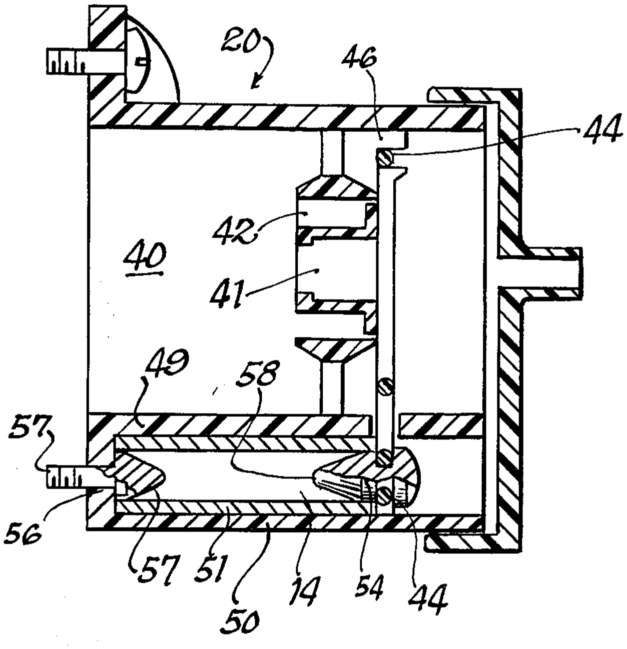
FIG. 3 is a sectional elevation view of the high voltage rectifier socket of FIG. 2.
Figure 4:
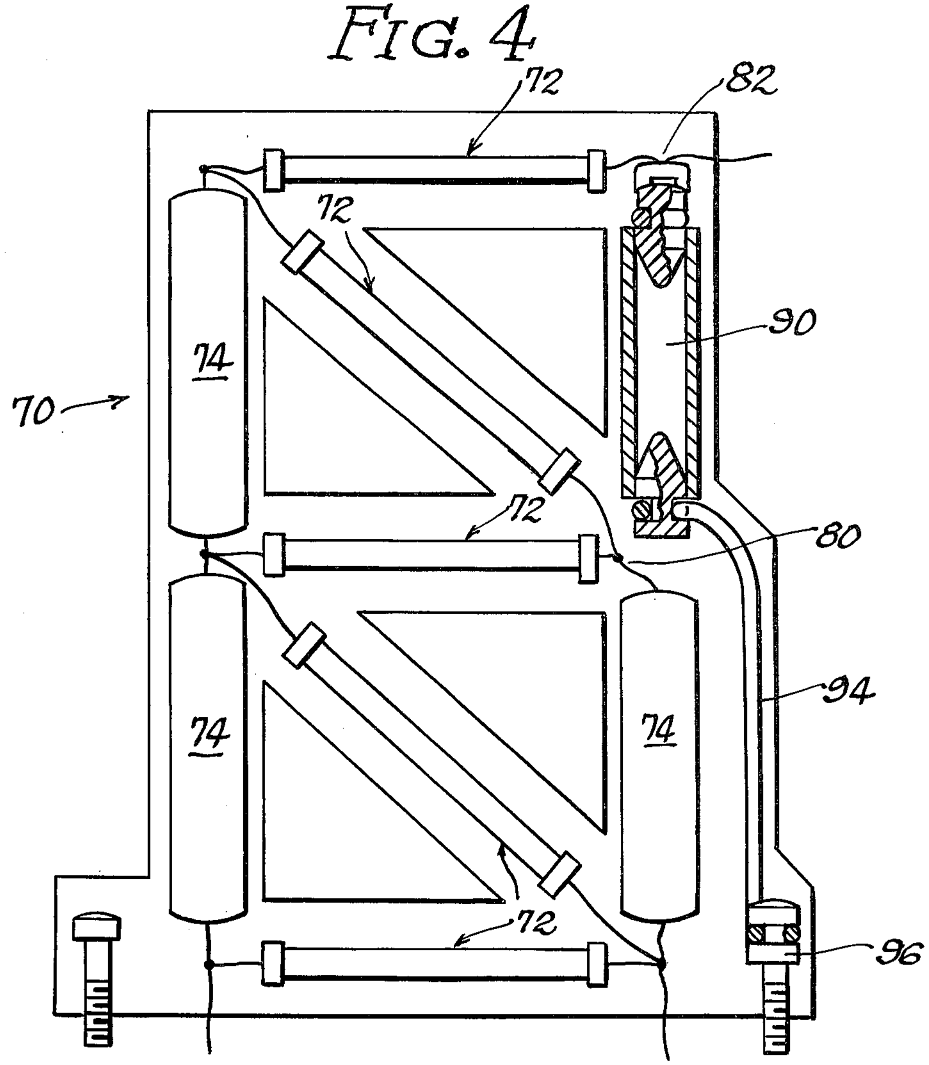
FIG. 4 is an elevation view of a high voltage tripler incorporating the spark gap constructed in accordance with this invention.
Figure 5:
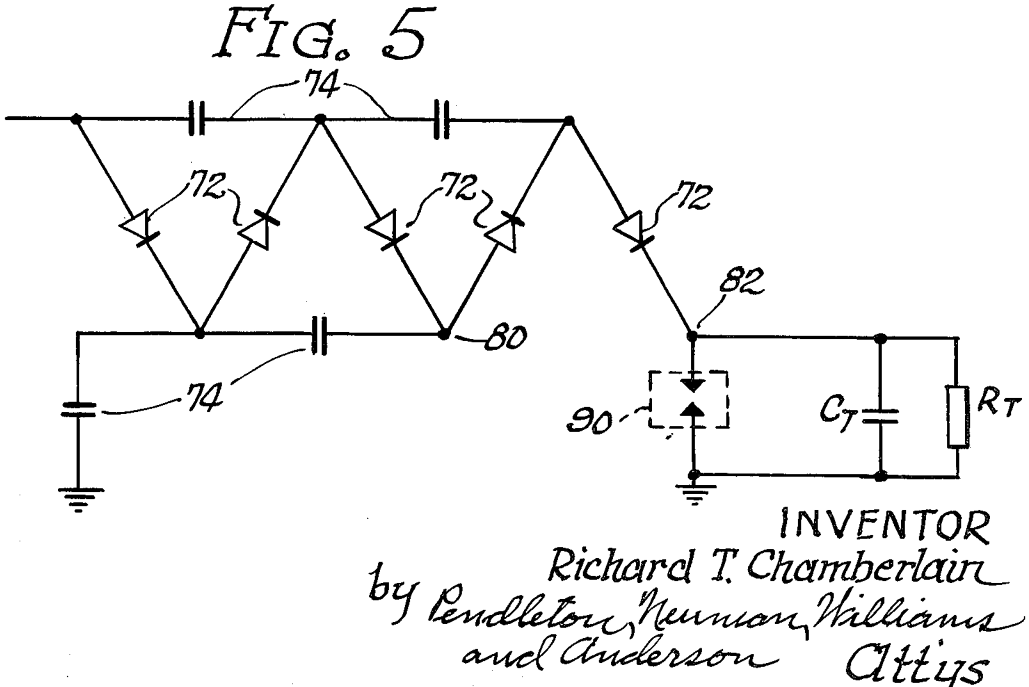
FIG. 5 is a schematic diagram of a spark gap in combination with the high voltage tripler of FIG. 4 and a cathode ray tube.

Two preferred tamper-proof constructions for the spark gap 2 are shown in the remaining figures. FIGS. 2 and 3 illustrate an embodiment where the spark gap is integrally incorporated into a high voltage rectifier socket 20. FIGS. 4 and 5 illustrate an embodiment where the spark gap is integrally built into a high voltage tripler structure.

The high voltage socket shown in FIGS. 2 and 3 is a part with critical insulation requirements and generally must be obtained from the original manufacturer in the event replacement is necessary. Thus, neither the owner nor the repairman can remove the overvoltage protective breakdown device from the receiver either purposely or accidentally.

The high voltage rectifier tube socket 20 shown in FIGS. 2 and 3 includes a recessed tube receptacle 40, with connecting pin sockets 42. A conventional corona ring 44 is supported by gusset 46 included in the socket to provide the necessary electrical connection between the high voltage output pin socket 42 and one electrode 54 of the spark gap. The spark gap assembly 14 is molded between an outside wall 50 and a spacing wall 49 of the tube receptacle 40, on one side of the high voltage rectifier socket 20. The spark gap 14 is mounted over the space normally occupied by one of the mounting studs. Therefore, an electrode 56 of the spark gap is extended and threaded to serve as a mounting stud for the rectifier socket as well as to ground the spark gap.

The spark gap 14 includes a tubular member 51 and two electrodes 54 and 56. A mounting stud 57 is securely attached to one electrode 56 for coupling that electrode to a ground within the television receiver. The other electrode 54 is connected through corona ring 44 to the high voltage output of rectifier 12.

The tubular member 51 of the spark gap 14 is formed from a material such as ceramic having a high dielectric constant so that there can be no discharge to a nearby element through the walls of the tube. The electrodes 54 and 56 are brass or a similar material of high conductivity. The spherical electrode tips 57 and 58 preferably have polished nickel or chromium plated surfaces to promote conductivity.

The spherical tips 57 and 58 preferably have a radius of about 3 millimeters (mm) and are separated by a distance of about 25 mm to establish a breakdown voltage of 27.5 KV, the maximun operating voltage of the receiver. To maintain accurate calibration of the gap despite varying external conditions, the tube is airtight and filled with dry nitrogen at one atmosphere pressure. Although other spark gaps and voltage breakdown devices may be used, this construction occupies a minimum amount of space (of obvious importance within a television receiver); there is little or no hiatus between application of the breakdown voltage and actual breakdown of the device, and the gap breaks down with a sharply defined spark discharge without formation of corona. It is important to curtail corona formation, under normal operating conditions, in order to prevent any deterioration of picture quality which might otherwise result. In normal use, the spherical gap electrodes do not have to be renewed after discharge occurs.

In an alternative embodiment, shown in FIGS. 4 and 5, the spark gap is built into a high voltage tripler assembly which is a conventional component used to supply the high anode voltage to the picture tube. The tripler 70 includes a "ladder" of diodes 72 and capacitors 74 which cooperate to function as series connected voltage doublers. In a conventional voltage tripler of the kind illustrated in the two figures, a capacitor is coupled from terminal 80 to terminal 82 (FIG. 5) and may be omitted with little loss in regulation. The effective capacitance of the picture tube supplies much of the omitted capacity. In this embodiment of the overvoltage protection device, the nonessential capacitor is omitted from the high voltage tripler, and the space it would have occupied in the module 70 of FIG. 4 is taken up by a spark gap 90, constructed in the same way as the one described above. One electrode of the spark gap 90 is connected to the high voltage output terminal 92; the other end is connected to ground through a low impedance lead 94 to grounded stud 96. Should the output of the high voltage tripler module exceed the calibrated sparkover voltage of spark gap 90, the gap breaks down providing a low impedance path to ground for the cathode ray tube beam current with the beam current effectively shunted to ground.

While two particular embodiments of this invention are shown above and described, it will be understood, of course, that the invention is not to be limited thereto; many modifications of the breakdown device are possible.

What is claimed is:

1. In a television receiver circuit, a picture tube including an ultor anode having a predetermined maximum operating voltage, high voltage supply means coupled to said anode for supplying said operating voltage thereto, spark gap means coupled between said supply means and ground for reducing the voltage supplied to said anode in the event the voltage supplied to said anode tends to exceed said predetermined maximum, thereby reducing the operating voltage to a predetermined level where undesirable X-radiation will not occur, said spark gap means having a breakdown voltage approximately equal to said predetermined maximum operating voltage, said spark gap means including a tube of material having a high dielectric constant, a pair of terminal members disposed at the extremities of said tube, said terminal members having interior ends adapted to serve as spark gap electrodes, and means for hermetically sealing said terminal members within the ends of said tube thereby defining an airtight cavity within said tube, said terminal members and said tube being so constructed and arranged that the sparkover voltage between the interior ends of said spark gap means is said predetermined operating voltage, a high voltage rectifier tube socket, said spark gap means being integrally incorporated into said tube socket and removable from said receiver only by removing said socket.

2. In a television receiver circuit, a picture tube including an ultor anode having a predetermined maximum operating voltage, high voltage supply means coupled to said anode for supplying said operating voltage thereto, spark gap means coupled between said supply means and ground for reducing the voltage supplied to said anode in the event the voltage supplied to said anode tends to exceed said predetermined maximum thereby reducing the operating voltage to a predetermined level where undesirable X-radiation will not occur, said spark gap means having a breakdown voltage approximately equal to said predetermined maximum operating voltage, said spark gap means including a tube of material having a high dielectric constant, a pair of terminal members disposed at the extremities of said tube, said terminal members having interior ends adapted to serve as spark gap electrodes, and means for hermetically sealing said terminal members within the ends of said tube thereby defining an airtight cavint within said tube, said terminal members and said tube being so constructed and arranged that the sparkover voltage between the interior ends of said spark gap means is said predetermined operating voltage, a high voltage multiplying device for supplying the high operating voltage to said ultor anode, said multiplying device being encapsulated in insulating material together with said spark gap means.

* * * * *